United States Patent [19]
Okada

[11] Patent Number: 5,627,452
[45] Date of Patent: May 6, 1997

[54] CHARGING METHOD OF SECONDARY BATTERY

[75] Inventor: Tetsuya Okada, Hyogo, Japan

[73] Assignee: Sanyo Electric Co., Ltd., Osaka, Japan

[21] Appl. No.: 534,789

[22] Filed: Sep. 27, 1995

[30]  Foreign Application Priority Data

Sep. 30, 1994 [JP] Japan .................................. 6-237289

[51] Int. Cl.$^6$ ........................................ H02J 7/00
[52] U.S. Cl. ................................ 320/21; 320/30
[58] Field of Search ........................ 320/21, 22, 23, 320/30, 31, 32, 34, 48

[56]  References Cited

U.S. PATENT DOCUMENTS

| | | | |
|---|---|---|---|
| 4,746,852 | 5/1988 | Martin | 320/20 |
| 4,746,854 | 5/1988 | Baker et al. | 320/40 |
| 5,206,579 | 4/1993 | Kawate et al. | 320/20 |
| 5,237,259 | 8/1993 | Sanpei | 320/23 |
| 5,311,113 | 5/1994 | Kojima | 320/20 |
| 5,467,005 | 11/1995 | Matsumoto et al. | 320/20 |

FOREIGN PATENT DOCUMENTS

| | | | |
|---|---|---|---|
| 60-13253 | 4/1985 | Japan | H02J 7/10 |
| 61-288740 | 12/1986 | Japan | H02J 7/10 |

*Primary Examiner*—Peter S. Wong
*Assistant Examiner*—Gregory J. Toatley, Jr.
*Attorney, Agent, or Firm*—Loeb & Loeb LLP

[57]  ABSTRACT

A charging apparatus is provided which determines whether a preliminary full charge indication such as a peak of the terminal voltage or a decrease of a predetermined voltage ΔV after the peak indicates a true full charge level. In accordance with the present invention, when the charging apparatus detects a peak or a decrease of a predetermined voltage ΔV after the peak in the terminal voltage, the apparatus can determine whether or not the detection indicates a true full charge level by taking into account the charging amount from the start of charging until the detection of the peak or the decrease.

19 Claims, 6 Drawing Sheets

CHARGING METHOD OF SECONDARY BATTERY

FIELD OF THE INVENTION

The present invention relates generally to the charging of a secondary battery, and more particularly, to detection of a full charge level.

BACKGROUND OF THE INVENTION

A secondary battery is a battery that can be repetitively recharged. However, if a secondary battery is charged beyond the full charge level, such overcharging can cause deterioration of the overcharged secondary battery. For example, the life span of the secondary battery is typically decreased by overcharging. In addition, a nickel-hydrogen secondary battery is susceptible to weakening as a result of excessive charging. Therefore, it is important to properly detect a full charge level in order to prevent the secondary battery from being overcharged.

The charging characteristics of a secondary battery often depend upon the type of the secondary battery. For example, a nickel-cadmium secondary battery or a nickel-hydrogen secondary battery has a charging characteristic in which the terminal voltage of the secondary battery typically peaks when the secondary battery is fully charged. Such charging characteristics may be monitored to detect a full charge level.

For example, Japanese Utility Model No. SHO 60-13253 describes a charging method in which a charging apparatus monitors the terminal voltage of the secondary battery and indicates a full charge level when a terminal voltage peak is detected. Such systems are hereinafter referred to as peak control systems.

Japanese Patent Laid-open No. SHO 61-288740 describes a charging method which determines that the full charge level has been reached following detection of a decrease of a predetermined voltage $\Delta V$ after a peak of the terminal voltage. Such systems are hereinafter referred to as a $-\Delta V$ control system.

FIG. 1 depicts the charging characteristics of a secondary battery being charged in accordance with a typical $-\Delta V$ control system. The battery which has been previously been discharged to a full discharge level is first charged with a constant current. Soon after charging is initiated, the terminal voltage rapidly rises to a high level. Then, the terminal voltage more gradually increases. Finally, charging is terminated when the terminal voltage of the secondary battery decreases by a predetermined voltage $\Delta V$ following a peak (P).

Referring now to FIG. 2, if a secondary battery has been once over discharged, its charging characteristic sometimes shows a small peak (Ps) followed by a decrease of a predetermined voltage $\Delta V$ after the small peak (Ps) before the full charge level (Pr) is actually reached as shown in FIG. 2. Therefore, if a peak control system or a $-\Delta V$ control system is used to detect the full charge level of a battery having such a charging characteristic, the charging apparatus may mistake the small peak and the decrease of the $\Delta V$ after the small peak for the full charge level. As a result, although the charge level has not actually reached the full charge level, charging is mistakenly terminated.

In order to avoid a false detection of the full charge level, the following method is known. During a predetermined time interval following the initiation of charging, the charging apparatus continues charging without monitoring the terminal voltage for a peak followed by a decrease of $\Delta V$. After the predetermined time period has elapsed, the charging apparatus starts monitoring the terminal voltage for the peak followed by the decrease of $\Delta V$. When these events are detected, charging is terminated.

However, this method has the following disadvantage as illustrated in FIG. 3. If the secondary battery to be charged is at or near a full charge level when charging is initiated, the secondary battery will be overcharged. As shown in FIG. 3, even though the terminal voltage exhibits a peak followed by a decrease of $\Delta V$, the predetermined time length will not yet have elapsed and charging will be continued.

SUMMARY OF THE INVENTION

It is an object of the present invention to provide a charging method which reduces overcharging of secondary batteries, and improves the accurate detection of a full charge level.

These and other objects are achieved by a method of charging, in accordance with one embodiment of the present invention, which comprises comparing an initial terminal voltage of the battery to a predetermined minimum in order to determine if the battery was initially at or near the full charge level before charging was initiated. Once charging is initiated, the charge amount of the battery is monitored until a preliminary indication of full charge level is detected. In the illustrated embodiment, a preliminary indication of a full charge level is provided when it is determined that the terminal voltage of the secondary battery being charged has reached a peak or has decreased by a predetermined amount ($\Delta V$).

Upon detecting a preliminary indication of full charge level, if the initial terminal voltage of the battery was found to have exceeded the predetermined minimum, the preliminary indication of full charge level is considered to indicate an actual full charge level and charging is completed. In this manner, overcharging of a secondary battery which was at or near full charge level before charging was initiated can be substantially reduced or eliminated.

On the other hand, if the initial terminal voltage of the battery was found to be less than the predetermined minimum, the battery is considered to have been at or near full discharge before charging was initiated. Therefore, in accordance with another aspect of the present invention, the accumulated charge amount is also examined. If the charge amount accumulated at the time the preliminary indication of full charge was detected, is found to be less than the predetermined minimum, the preliminary indication of full charge level is not considered to indicate the actual full charge level, i.e. it is considered to be a false indication, and charging is continued. Conversely, if the accumulated charge amount exceeded the predetermined minimum, the detected preliminary indication of full charge level is considered to indicate an actual full charge level and charging is completed. As a consequence, false indications of full charge level can be avoided, ensuring that a full charge is reached before charging is completed. Furthermore, true indications of full charge level can be accurately detected, thereby avoiding unnecessary overcharging of batteries.

DETAILED DESCRIPTION OF THE PREFERRED EMBODIMENTS

Figure 1:
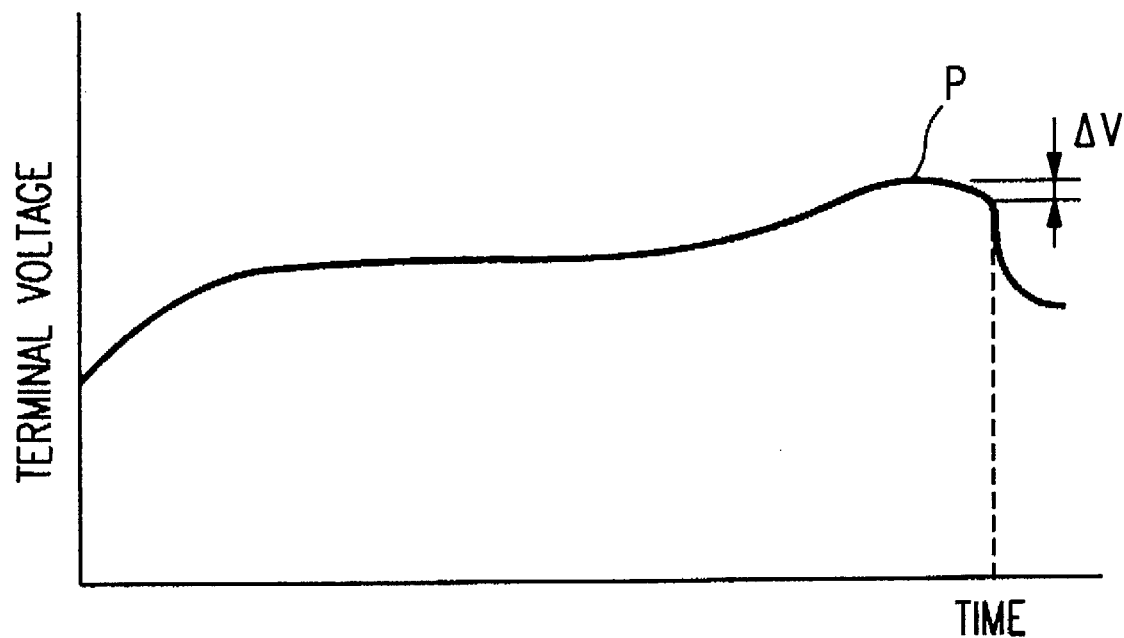
FIG. 1 is a graph showing charging characteristics of conventional charging systems.
Figure 2:
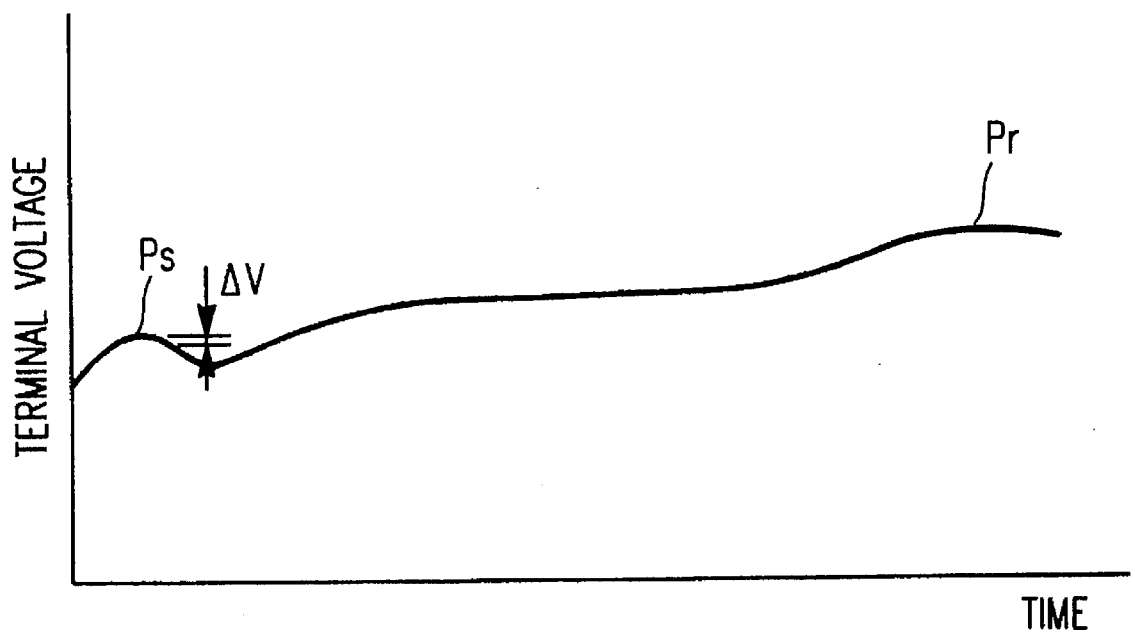
FIG. 2 is a graph showing other charging characteristics of a secondary battery.
Figure 3:
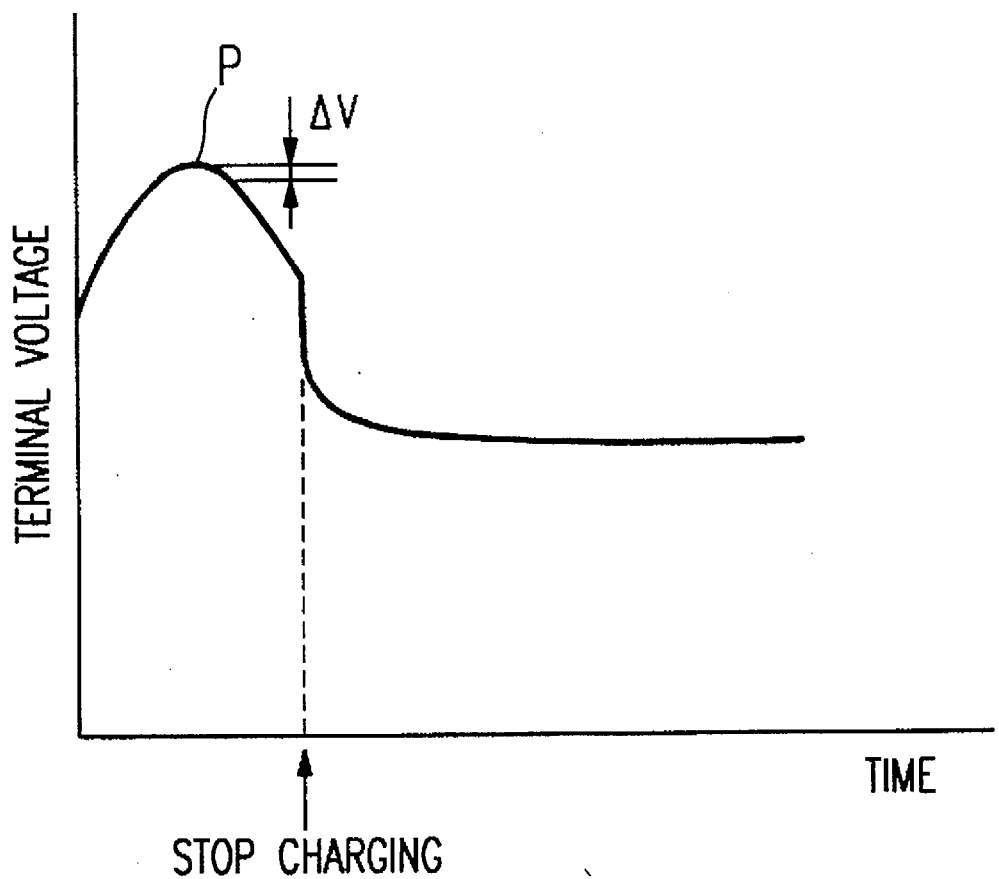
FIG. 3 is a graph showing additional charging characteristics in which a secondary battery at or near a full charge level is charged by conventional charging systems.

An embodiment of the present invention is described with reference to FIGS. 4–6. As will be explained in greater detail below, in accordance with one embodiment of the present invention, when a charging apparatus detects a preliminary indication of a full charge level, such as detecting a peak in the terminal voltage or a decrease in the terminal Voltage by a predetermined amount $\Delta V$ after the peak, the apparatus can determine whether the preliminary indication is a true indication of a full charge level by taking into account the amount of charging which has taken place from the initiation of charging to the detection of the peak or decrease in the terminal voltage.

More specifically, one embodiment of the present invention comprises the following steps. Before or soon after a charging apparatus starts charging a secondary battery, an initial terminal voltage (V0) is compared with a predetermined voltage value. Based on this comparison, the charging apparatus determines whether the secondary battery is closer to a full charge level or closer to a full discharge level. If the secondary battery was closer to the full charge level when charging was initiated, the apparatus will stop charging when the first indication of a full charge is detected.

On the other hand, if the secondary battery was closer to the full discharge level when charging was initiated, additional steps are also performed. As previously mentioned, when the secondary battery is at or near a full discharge level when charging is initiated, it sometimes happens that even though the apparatus detects a full charge indication such as a peak in the terminal voltage or a decrease in the terminal voltage by a predetermined voltage $\Delta V$ after the peak, the charge level may not have actually reached a full charge level.

Accordingly, in accordance with the illustrated embodiment, when the apparatus detects a peak terminal voltage or a decrease of a predetermined voltage $\Delta V$ after the peak, the apparatus compares the charge amount from the beginning of charging to the detection of the full charge indication, to a predetermined charge amount in order to determine whether the detected full charge level indication is a true indication that the battery has actually been charged to the full charge level. If the charge amount is more than the predetermined charge amount, the detected full charge indication is considered to be a true indication that the charge level is actually around the full charge level, and the apparatus stops charging.

On the other hand, if the charge amount is not more than the predetermined charge amount, the detected full charge indication is considered to be false, that is, the charge level has not reached a full charge level, and the apparatus continues charging. When the apparatus subsequently detects another peak or another decrease of a predetermined voltage $\Delta V$, the monitored charge amount is again compared to the predetermined amount. If the charge amount exceeds the predetermined charge amount, the apparatus stops charging.

Figure 4:
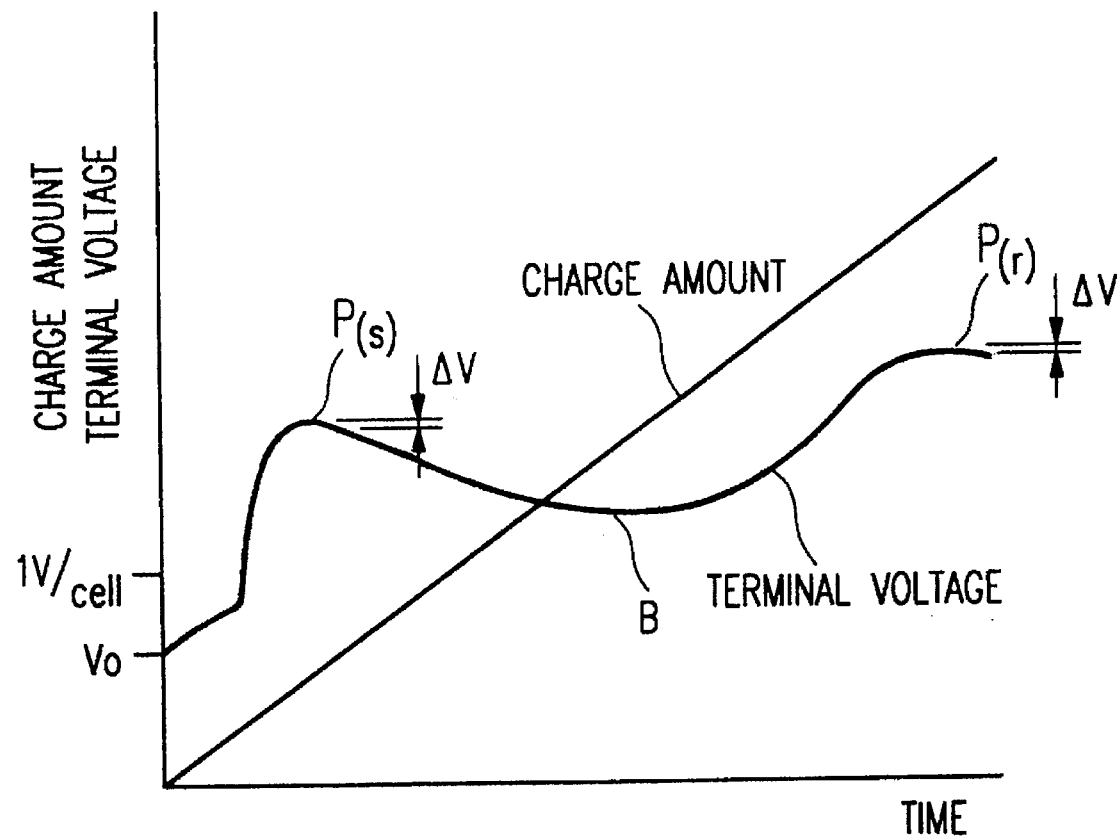
FIG. 4 is a graph showing a charging process in accordance with an embodiment of the present invention.

FIG. 4 illustrates charging a nickel-hydrogen secondary battery in accordance with one embodiment of the present invention. A secondary battery, for example, a nickel-hydrogen secondary battery or a nickel-cadmium secondary battery, sometimes exhibits the charging characteristics shown in FIG. 4. As charging progresses, the terminal voltage of the secondary battery shows a small peak (Ps) followed by a decrease of a predetermined voltage $\Delta V$ after the small peak (Ps) before a peak value (Pr) associated with the actual full charge level is achieved. Following the small peak (Ps), the terminal voltage gradually decreases to a bottom (B) before rising again to the higher peak (Pr). It may take 10–20 minutes from the initiation of charging to charge to the small peak (Ps). If this secondary battery is charged by the aforementioned conventional charging technique where a charging apparatus continues charging for a predetermined time period without monitoring for a peak and a decrease of a $\Delta V$, the nickel-hydrogen secondary battery may be overcharged.

In this embodiment, to avoid overcharging, the apparatus first samples an initial terminal voltage (V0) of the secondary battery when the charging apparatus starts charging. The sampled initial terminal voltage (V0) is then compared to a predetermined voltage value. If the secondary battery is a nickel-hydrogen secondary battery, the predetermined voltage value is preferably set to 1 V per cell where a cell is a secondary battery. The predetermined voltage value may be selected based upon the type of the secondary battery and another test factor, a predetermined charge amount, as explained in detail below. For example, for a nickel-cadmium secondary battery or a nickel-hydrogen secondary battery, the predetermined voltage value is preferably set within a range of 0.8 V–1.2 V/cell, and more preferably 0.9 V–1.1 V/cell.

By comparing the sampled initial terminal voltage (V0) to the predetermined voltage value, a determination is made as to whether the secondary battery is closer to a full charge level or closer to a full discharge level. In the example of FIG. 4, the initial terminal voltage (V0) of the secondary battery being charged is less than the predetermined voltage value (e.g., 1 V/cell). Accordingly, the secondary battery is determined to be closer to the full discharge level than the full charge level. Consequently, the apparatus monitors the charge amount from the beginning of charging until a peak or a decrease of a predetermined voltage $\Delta V$ after the peak is detected. In the illustrated embodiment, the predetermined voltage $\Delta V$ is typically set to 10–30 mV.

When the apparatus first detects a peak or a decrease of $\Delta V$ in the terminal voltage, it may be the small peak (Ps) or the decrease of the $\Delta V$ after the small peak (Ps) rather than the peak (Pr) associated with the full charge level. Accordingly, the apparatus compares the charge amount from the start of charging to this detection, to a predetermined charge amount, in order to determine whether the charge level when the peak or the decrease is detected, is in fact at or near the full charge level. In this example, the charge amount would be found to be less than the predetermined charge amount, indicating that the charge level has not reached around the full charge level. Therefore, the apparatus continues charging.

When the apparatus detects another peak, i.e., peak (Pr) (or another decrease $\Delta V$), the monitored charge amount will have exceeded the predetermined charge amount. In this manner, the detected peak (or decrease $\Delta V$) is verified as being the peak associated with the actual full charge level, and the apparatus stops charging.

The predetermined charge amount may be set to, for example, 60% of the full charge capacity. However, the predetermined charge amount is preferably set to 40–80%, and more preferably 50–70%. When the predetermined voltage value used to measure the battery's initial charge level as desired above is set to a relatively low level, the predetermined charge amount can be set to a relatively large value.

As used herein, the terms "stopping charging" and "completing charging" are intended to describe embodiments in which the charging current is completely shut off, as well as embodiments in which the charging current is reduced to a very low level.

If a malfunction in the secondary battery should occur, the battery's charging characteristics may not exhibit a peak followed by a decrease of a predetermined voltage $\Delta V$. Absent such an indication of full charge level, the apparatus could continue charging. In an alternative embodiment, a timer may be provided to terminate charging if the apparatus does not detect a peak or a decrease of a predetermined voltage $\Delta V$ within a predetermined time period as measured by the timer.

Figure 5:
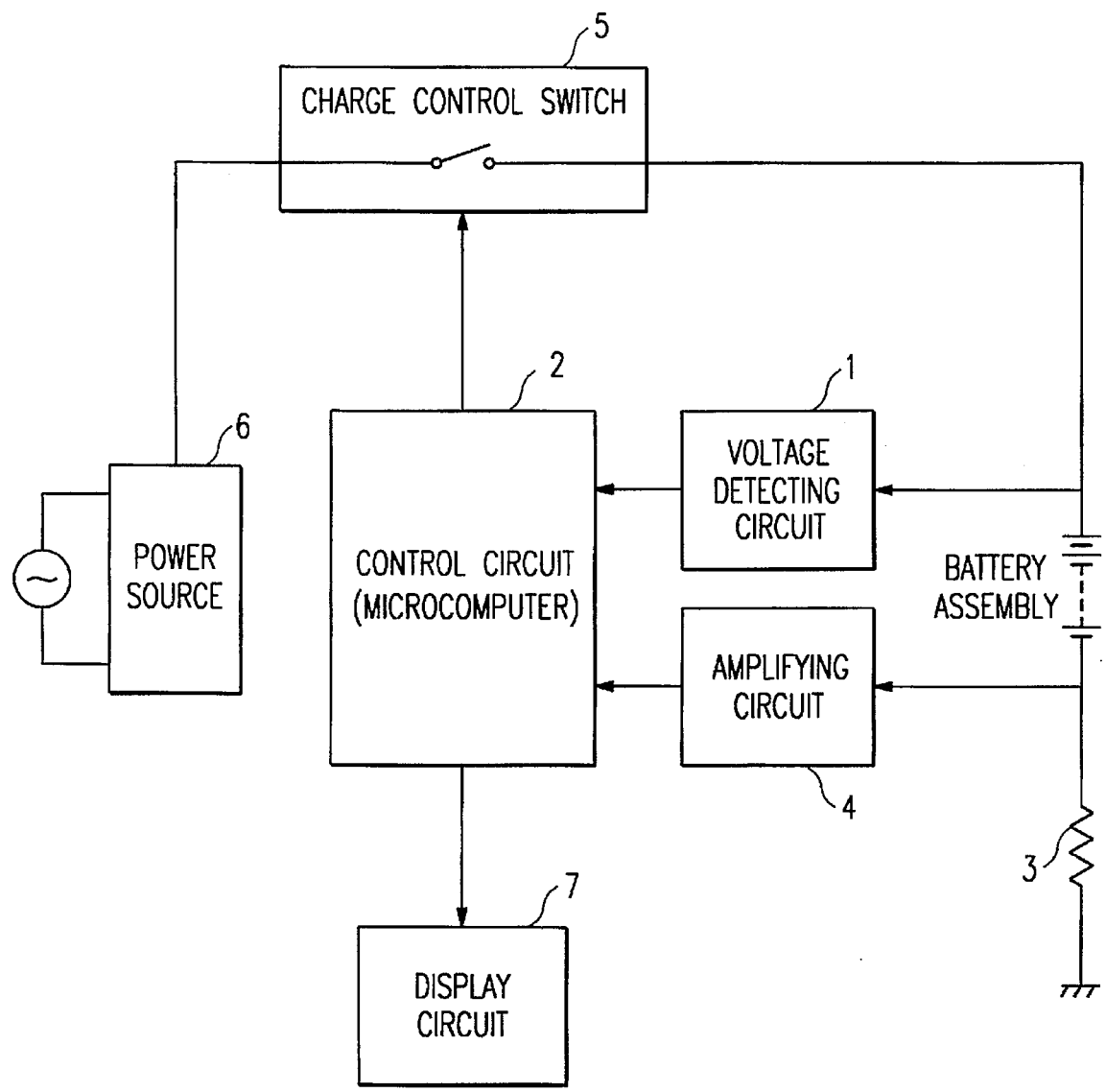
FIG. 5 is a block diagram of a charging apparatus in accordance with an embodiment of the present invention.

FIG. 5 shows a block diagram of a charging apparatus in accordance with a preferred embodiment. The apparatus comprises a voltage detecting circuit 1 which monitors the terminal voltage of the battery assembly of the secondary batteries and outputs data in response to the monitored terminal voltage to a control circuit 2.

A current detecting resistance 3 exhibits a voltage across the resistance 3 which is proportional to a current flowing through it. An amplifying circuit 4 amplifies the voltage across the current detecting resistance 3, and provides the amplified signal to the control circuit 2. A charge control switch 5 is turned on and off by the control circuit 2 to permit the apparatus to charge the battery assembly or to stop charging. A power source 6 converts line alternating current to a suitable direct current for charging. A display circuit 7 connected to the control circuit 2 displays the charging state.

The control circuit 2 which may be implemented with a microprocessor, for example, calculates a charge amount as a function of the elapsed time multiplied by a current value calculated from the amplified current data from the current detecting resistance 3. The control circuit 2 also detects a peak of the terminal voltage or a decrease of a predetermined voltage $\Delta V$ after the peak, based on the periodically sampled terminal voltage from voltage detecting circuit 1. By taking into account not only the detection of a peak or a decrease of the $\Delta V$, but also the charge amount as explained above, the apparatus can reliably identify the full charge level, and thereby turn the charge control switch 5 off at the appropriate time.

Figure 6:
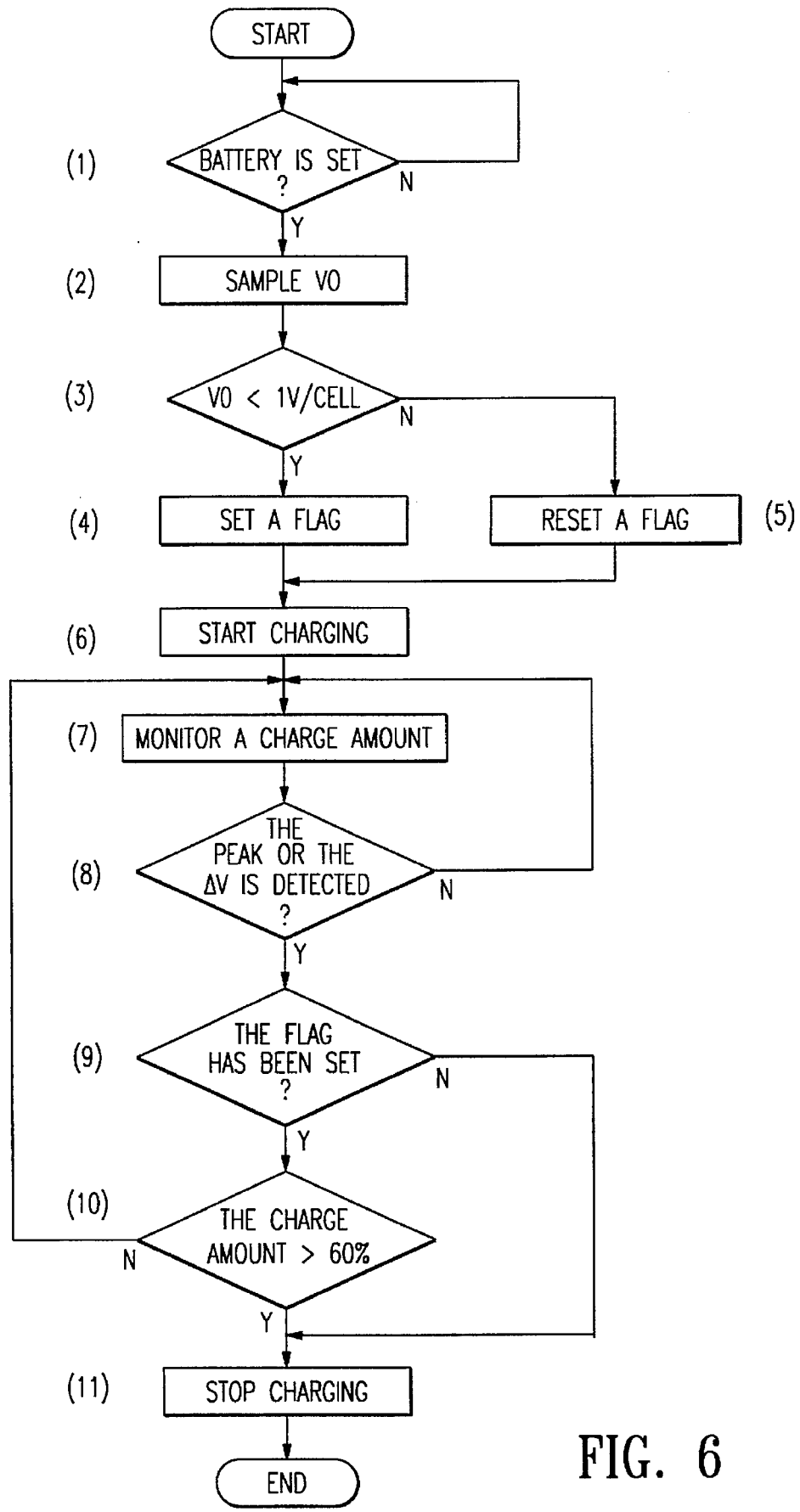
FIG. 6 is a flow chart showing a method of charging a secondary battery in accordance with a first embodiment of the present invention.

The charging method in accordance with the first embodiment will now be described below with reference to a flow chart as shown in FIG. 6. After the apparatus starts the process, the apparatus determines (step 1) whether the secondary battery is set. If the secondary battery is set, the apparatus samples an initial terminal voltage (V0) of the terminal voltage of the secondary battery (step 2).

A determination is then made (step 3) as to whether the sampled initial terminal voltage (V0) is less than a predetermined voltage value, in order to determine whether the initial charge level of the secondary battery is near the full discharged level. In this embodiment, the predetermined voltage value is set to 1 V/cell which is suitable for nickel-cadmium secondary batteries as well as nickel-hydrogen secondary batteries. The predetermined voltage value should be set to an intermediate value between the terminal voltage of a fully charged secondary battery and the terminal voltage of a fully discharged secondary battery.

If the sampled initial terminal voltage (V0) is less than the predetermined voltage value, a flag is set (step 4) indicating that the secondary battery is considered to be at or near full discharge. On the other hand, if the sampled initial terminal voltage (V0) is equal to or greater than the predetermined voltage value, the flag is reset (step 5) indicating that the initial condition of the battery is considered to be at or near full charge.

In the illustrated embodiment, the apparatus starts rapidly charging the secondary battery (step 6) after the initial terminal voltage is sampled. It should be appreciated however, that the terminal voltage may be sampled for an initial charge state after charging is started so long as the initial charge state sample is taken before overcharging can occur.

A nickel-cadmium secondary battery or a nickel-hydrogen secondary battery may be rapidly charged with a constant charging current. The apparatus then starts monitoring the charge amount (step 7), by calculating the elapsed time multiplied by the charging current monitored through the current detecting resistance 3.

A determination is made (step 8) as to whether the apparatus has detected a peak or a decrease of a predetermined voltage value $\Delta V$ after a peak. If the apparatus has not detected a peak or a decrease of $\Delta V$ after a peak, the process returns to step 7, and the apparatus continues to charge and monitor the charge amount.

Once the apparatus detects a peak or a decrease of $\Delta V$ after a peak, a determination is made (step 9) as to whether the initial discharge level flag has been set. If the flag has not been set, indicating that the initial charge level of the secondary battery was determined in step 3 to be around the full charge level, the detection of the peak or the decrease of $\Delta V$ indicates that the full charge level has been reached. Therefore, the apparatus stops charging (step 11).

On the other hand, if the flag has been set, a determination is made (step 10) as to whether the monitored charge amount is more than a predetermined charge amount (e.g., 60% of the full charge capacity). If the monitored charged amount is determined to be more than the predetermined charge amount, the detection of the peak (or decrease of $\Delta V$) is considered to indicate that the charge level has reached the full charge level, and the apparatus stops charging (step 11).

On the other hand, if the monitored charge amount is less than or equal to the predetermined charge amount, indicating that the charge level has not reached the full charge level, the detection of the peak (or decrease of $\Delta V$) is ignored and the process returns to continue charging (step 7). The apparatus continues charging until both a peak (or a decrease of $\Delta V$ after a peak) is detected (step 8) and the monitored charge amount exceeds the predetermined charge amount (step 10). If both conditions are met, the battery is considered to be fully charged and the charging process is completed by stopping charging all together or reducing charging to a small amount.

It will, of course, be understood that modifications of the present invention, in its various aspects will be apparent to those skilled in the art, some being apparent only after study and others being matters of routine electrical design. As such, the scope of the invention should not be limited by the particular embodiments herein described but should be defined only by the appended claims and equivalents thereof.

What is claimed:

1. A method of charging a secondary battery, comprising:
  A) comparing an initial terminal voltage of the battery to a predetermined minimum;

B) charging the battery;

C) monitoring the terminal voltage of the battery for at least one of a voltage peak and a decrease in voltage of a predetermined amount; and D1) if the initial terminal voltage of the battery exceeded a predetermined minimum, completing charging when either a terminal voltage peak or a decrease in terminal voltage of a predetermined amount is detected; or D2) if the initial terminal voltage of the battery was less than a predetermined minimum, D2i) monitoring the charge amount of the battery; and D2ii) completing charging when either a terminal voltage peak or a decrease in terminal voltage of a predetermined amount is detected and the charge amount exceeds a predetermined value.

2. A method of charging a secondary battery, comprising:

A) comparing an initial terminal voltage of the battery to a predetermined minimum;

B) charging the battery;

C) monitoring the charge amount of the battery;

D) detecting a preliminary indication of full charge level; and

E1) upon detecting a preliminary indication of full charge level, if the initial terminal voltage of the battery exceeded a predetermined minimum, completing charging; or E2) upon detecting a preliminary indication of full charge level, if the initial terminal voltage of the battery was less than the predetermined minimum, and E2i) if the charge amount exceeds a predetermined value, completing charging; or E2ii) If the charge amount is less than the predetermined value, repeating steps C, D and E2 until both a preliminary indication of full charge level is detected and the charge amount exceeds the predetermined minimum.

3. A method of charging a secondary battery, comprising:

A) comparing an initial terminal voltage of the battery to a predetermined minimum;

B) charging the battery;

C) detecting a preliminary indication of full charge level; and

D1) upon detecting a preliminary indication of full charge level, if the initial terminal voltage of the battery exceeded a predetermined minimum, completing charging; or D2) upon detecting a preliminary indication of full charge level, if the initial terminal voltage of the battery was less than the predetermined minimum, D2i) determining if the preliminary indication of full charge level was a false indication; and D2ia) if the preliminary indication of full charge level was a true indication, completing charging; or D2ib) if the preliminary indication of full charge level was a false indication, repeating steps C and D2 until a true indication of full charge level is detected.

4. A method of charging a secondary battery, comprising:

A) starting charging of the secondary battery with a constant current;

B) sampling an initial terminal voltage of the secondary battery;

C) continuing charging when the sampled terminal voltage is more than a predetermined voltage value;

D) proceeding with the following steps when the sampled terminal voltage is not more than the predetermined voltage value;

D1) monitoring a charge amount of the secondary battery from the start of charging until the terminal voltage shows at least one of a peak level and a decrease of a predetermined voltage $\Delta V$ after the peak;

D2) continuing charging when the monitored charge amount is not more than a predetermined charge amount; and D3) stopping charging when the monitored charge amount is more than the predetermined charge amount.

5. A method according to claim 4, wherein a full charge level is detected when the terminal voltage of the secondary battery shows at least one of a peak and a decrease of a predetermined voltage $\Delta V$ after the peak.

6. A method according to claim 4, wherein in the step of C) of continuing charging, charging is continued until the terminal voltage shows at least one of a peak and a decrease of a predetermined voltage $\Delta V$ after the peak.

7. A method according to claim 4, wherein in the step of D2) of continuing charging, charging is continued until the terminal voltage shows at least one of another peak and another decrease of a predetermined voltage $\Delta V$ after other peak.

8. A method according to claim 4, wherein the secondary battery is a nickel-hydrogen secondary battery.

9. A method according to claim 4, wherein the secondary battery is a nickel-cadmium secondary battery.

10. A method of charging a secondary battery, comprising:

A) starting the charging of the secondary battery with a constant current;

B) sampling an initial terminal voltage of the secondary battery;

C) monitoring a charge amount of the secondary battery from the start of charging until the terminal voltage shows one of a peak and a decrease of a predetermined voltage $\Delta V$ after the peak; and D1) if the sampled terminal voltage is more than the predetermined voltage value, identifying the one of the peak and the decrease of the predetermined voltage $\Delta V$ as a full charge level; or D2) if the sampled terminal voltage is not more than the predetermined voltage value; and D2i) if the monitored charge amount is more than the predetermined charge amount, identifying the one of the peak and the decrease of the predetermined voltage $\Delta V$ as the full charge level, or D2ii) if the monitored charge amount is not more than the predetermined charge amount, identifying the one of the peak and the decrease of the predetermined voltage $\Delta V$ as other than a full charge level.

11. A method according to claim 10, further comprising the step of if one of the peak and the decrease of the predetermined voltage $\Delta V$ is identified as the full charge level, stopping charging.

12. A method according to claim 10, further comprising the step of if the one of the peak and the decrease of the predetermined voltage $\Delta V$ is identified as other than the full charge level, continuing charging until the terminal voltage shows one of another peak and another decrease of a predetermined voltage $\Delta V$ after the peak.

13. A method according to claim 10, wherein the secondary battery is a nickel-hydrogen secondary battery.

14. A method according to claim 10, wherein the secondary battery is a nickel-cadmium secondary battery.

15. An apparatus for charging a secondary battery, comprising:

charging means for charging the secondary battery with a constant current;

sampling means for sampling a terminal voltage of the secondary battery when charging starts;

comparison means for comparing the sampled terminal voltage to a predetermined voltage value;

detecting means for detecting one of a peak and a decrease of a predetermined voltage $\Delta V$ after the peak;

monitoring means for monitoring a charge amount of the secondary battery from the start of charging until the terminal voltage shows one of a peak and a decrease of a predetermined voltage $\Delta V$ after the peak;

control means responsive to the comparison means and the detecting means for providing a full charge level indication signal in response to the detection of one of a peak and a decrease of the predetermined voltage $\Delta V$ when 1) the sampled terminal voltage is more than the predetermined voltage value; or 2) the sampled terminal voltage is not more than the predetermined voltage value, and the monitored charge amount is more than the predetermined charge amount; said control means further providing a less than full charge level indication signal in response to the detection of one of the peak and the decrease of the predetermined voltage $\Delta V$ when the sampled terminal voltage is not more than the predetermined voltage value and the monitored charge amount is not more than the predetermined charge amount.

16. An apparatus according to claim 15, wherein the control means has means for stopping the charging when the one of the peak and the decrease of the predetermined voltage $\Delta V$ is identified as the full charge level.

17. An apparatus according to claim 15, wherein the control means has means for continuing charging when the one of the peak and the decrease of the predetermined voltage $\Delta V$ is not identified as the full charge level.

18. An apparatus according to claim 15, wherein the secondary battery is a nickel-hydrogen secondary battery.

19. An apparatus according to claim 15, wherein the secondary battery is a nickel-cadmium secondary battery.

* * * * *